(12) United States Patent
Carr

(10) Patent No.: US 7,494,144 B1
(45) Date of Patent: Feb. 24, 2009

(54) STEP DEVICE FOR A VEHICLE

(76) Inventor: Jeffrey Carr, 27447 Bostik Ct., Temecula, CA (US) 92990

(*) Notice: Subject to any disclaimer, the term of this patent is extended or adjusted under 35 U.S.C. 154(b) by 0 days.

(21) Appl. No.: 11/726,131

(22) Filed: Mar. 20, 2007

(51) Int. Cl.
*B60R 3/02* (2006.01)
(52) U.S. Cl. ....................................................... 280/166
(58) Field of Classification Search ................. 280/163, 280/166, 169
See application file for complete search history.

(56) References Cited

U.S. PATENT DOCUMENTS

| | | | |
|---|---|---|---|
| 3,266,594 A * | 8/1966 | Antosh et al. ................. 182/91 |
| 3,561,786 A | 2/1971 | Lentz | |
| 3,758,134 A | 9/1973 | Stewart | |
| 3,762,742 A * | 10/1973 | Bucklen ..................... 280/166 |
| 3,980,319 A | 9/1976 | Kirkpatrick | |
| 4,017,093 A | 4/1977 | Stecker, Sr. | |
| 4,180,143 A | 12/1979 | Clugston | |
| 4,185,849 A | 1/1980 | Jaeger | |
| 4,231,583 A | 11/1980 | Learn | |
| 4,564,167 A | 1/1986 | Smith | |
| 4,623,160 A | 11/1986 | Trudell | |
| 5,137,294 A | 8/1992 | Martin | |
| 5,456,479 A | 10/1995 | Conger | |
| 5,513,866 A | 5/1996 | Sisson | |
| 5,738,362 A | 4/1998 | Ludwick | |
| 5,897,125 A * | 4/1999 | Bundy ......................... 280/166 |
| 6,149,172 A * | 11/2000 | Pascoe et al. ................ 280/166 |
| 6,170,842 B1 | 1/2001 | Mueller | |
| 6,530,588 B1 * | 3/2003 | Varney et al. ................ 280/166 |
| 7,007,961 B2 | 3/2006 | Leitner et al. | |
| 7,168,722 B1 | 1/2007 | Piotrowski et al. | |

* cited by examiner

*Primary Examiner*—Christopher P Ellis
*Assistant Examiner*—Bridget Avery
(74) *Attorney, Agent, or Firm*—Edward Sokolski; Don B. Finkelstein

(57) ABSTRACT

A support device for use in supporting a person on the side a vehicle extends from the side of a vehicle below the main body thereof and has a support member, which is clamped at one end to the vehicle frame. A step unit is attached to the other end of the support member. A panel for supporting the person is attached to the step unit. The support member has a pair of opposing rods at the end attached to the vehicle frame, these rods running along the opposite sides of the vehicle frame. The rods are clamped to the frame by bolts. The support member has a pair of arms which run at right angles to each other and a third arm running angularly between the pair of arms to form a triangular configuration. One of said pair of arms forms one of the rods running along the side of the vehicle frame. The step unit is attached to the end of the other one of the pair of arms. This attachment is made to permit pivotal movement of ninety degrees of the step relative to the other one of the pair of arms. This permits the resetting the position of the panel relative to the vehicle should it extend out too far from the sides of the vehicle.

4 Claims, 2 Drawing Sheets

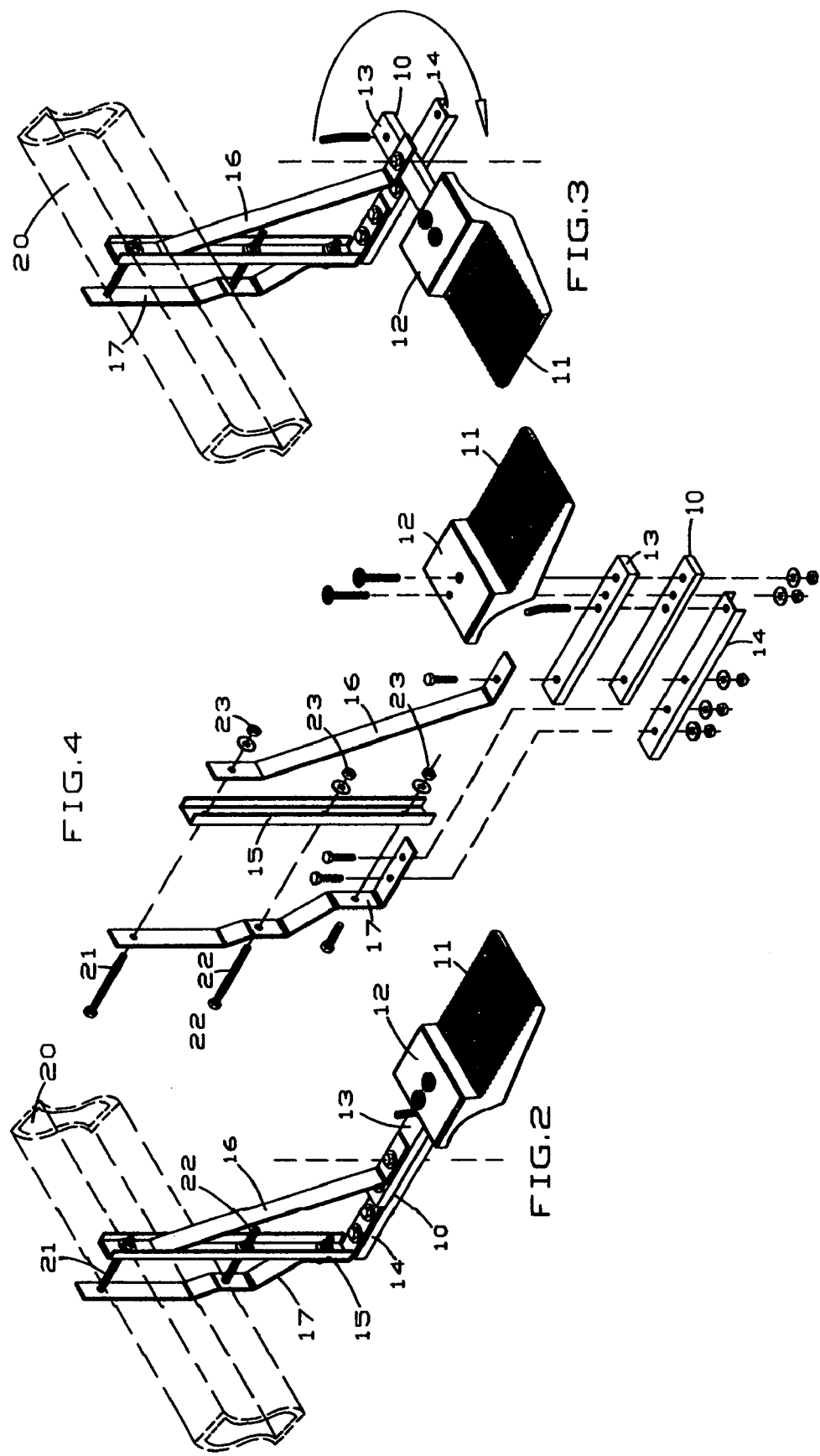

STEP DEVICE FOR A VEHICLE

BACKGROUND OF THE INVENTION

1. Field of the Invention

This invention relates to a step device for supporting an individual on the body of a vehicle to facilitate the loading and unloading of material onto the vehicle.

2. Description of the Related Art

Various step assemblies are provided on vehicles in the prior art for use in loading and unloading articles such as tool boxes and tools onto a vehicle. These prior art devices generally are installed on the side of the body of the vehicle either on the main frame of the vehicle or an attachment to the main frame. Such prior art devices are shown in U.S. Pat. No. 4,017,093 issued on Apr. 12, 1977 to Stecker, Sr. and U.S. Pat. No. 3,980,319 issued Sep. 14, 1976 to Kirkpatrick. These prior art devices while simple in design and extend out far enough from the vehicle when in use do not have designs which facilitate bringing the step in close to the sides of the vehicle when the vehicle is underway. In addition, they often do not have the strength needed to support an individual carrying a heavy load.

SUMMARY OF THE INVENTION

The device of the present invention employs a vehicle step support device, which is attached to the vehicle frame under a side portion of the vehicle. The support device includes a step unit attached to a flat panel and a support member attached to the step unit. The support member is clamped to the frame of the vehicle along a side thereof. The support member is formed from a pair of opposing rods which run along opposite sides of the frame. Bolts interconnect opposite portions of the rods to clamp them to the frame. The support member further has a pair of arms substantially at right angles to each other with a third arm running angularly between the pair of arms to form a triangular configuration. One of the arms of the pair of arms also forms one of the opposing rods, clamped to the frame. The step is attached to the other one of the pair of arms for pivotal positioning relative thereto. This pivotal positioning permits adjustment of the step and flat panel attached to the step to be repositioned by ninety degrees to reduce the extension of the panel from the side of the vehicle. Further, the support of the step on the frame of the vehicle increases the ability of the step to support persons carrying high weight articles for loading onto the vehicle.

DESCRIPTION OF THE DRAWINGS

FIG. 2 is a top-side perspective view illustrating an embodiment of the invention with the step extended straight out;

FIG. 3 is a side perspective view illustrating the preferred embodiment of the invention with the step oriented at right angles to the position shown in FIG. 2; and FIG. 4. is an exploded view of the preferred embodiment of the invention

SPECIFICATION

Figure 1:
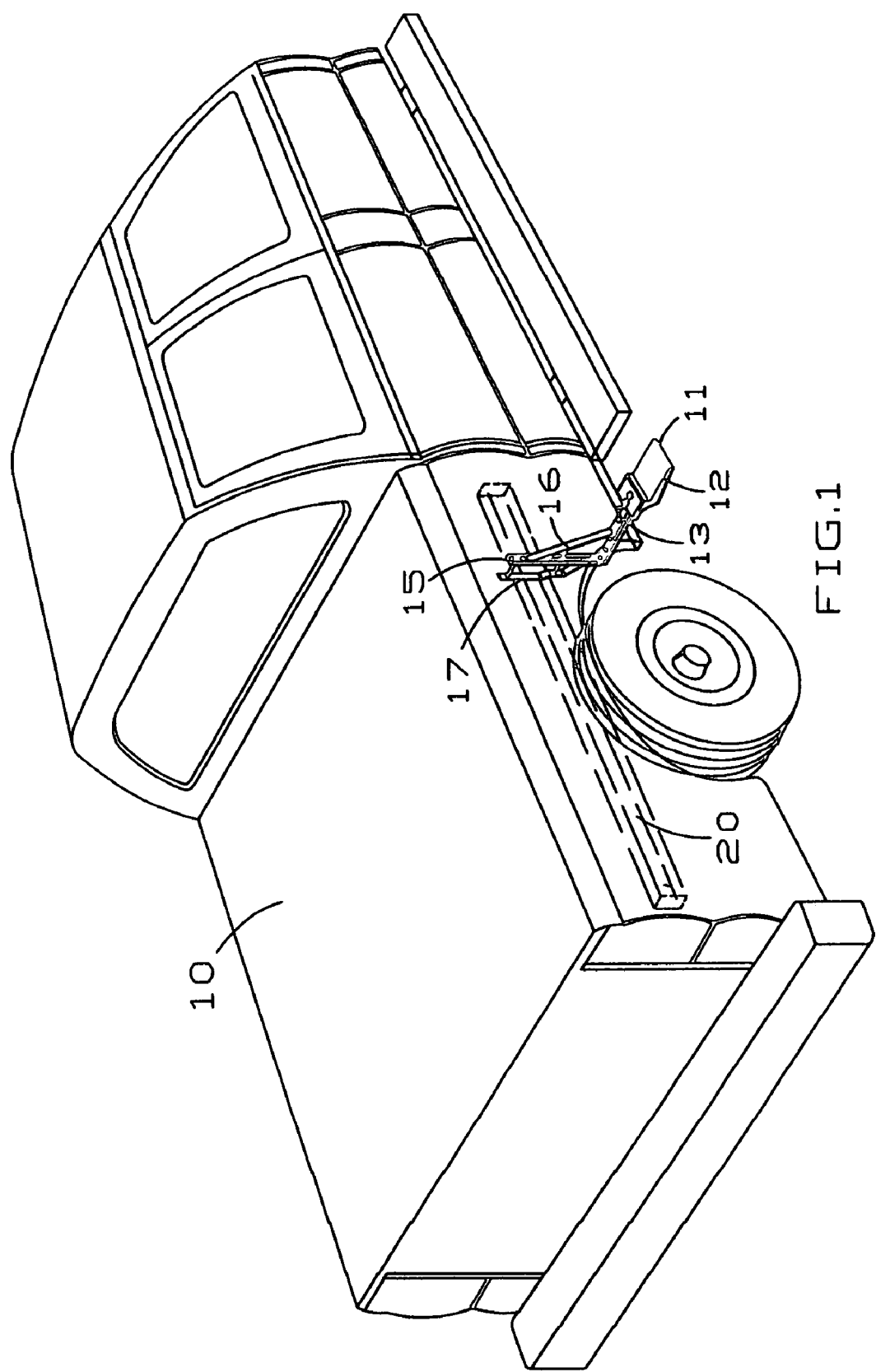
FIG. 1 is a top-side perspective view showing the device of the invention installed on a vehicle.

Referring to FIG. 1, the device of the invention is shown installed on a vehicle. The step assembly is attached to the frame 20 of vehicle 10 between rods 15 and 17 of the step assembly. Step unit 12 is supported on support arm 13 and has a flat panel 11 for use in supporting a person. The step unit is attached to rod 15 by arm 13. The step unit 12 is fixedly supported on arm 13 which is pivotally supported on arms 10 and 14, as shown in FIG. 3, so that it can be rotated ninety degrees to lessen the extension from the side of the vehicle.

Referring now to FIGS. 2-4, a preferred embodiment of the device of the invention is illustrated. As shown in these Figures, the step unit 12 and panel 11 are extended straight out from the support arm 13. As already noted, step unit 12 is fixedly attached to arm 13 which is supported for pivotal motion on arms 13 and 10. In FIG. 3, the device of the invention is illustrated with the step rotated ninety degrees from its initial position so that there is less extension of the panel 11 from the vehicle.

As can be seen in FIGS. 2 and 3, the support member has a first arm 13 fixedly attached to step 12 and second and third arms 10 and 14 to which arm 13 is pivotally attached. Rod 15 extends upwardly at right angles to arm 14. Arm 16 is attached at one end to rod 15 and at the other end to arm 13. Arm 16 runs angularly between the upper portion of arm 15 and arm 13 to form a triangular configuration which strengthens the support member.

Arm 14 has an open central portion which is fitted over the end portion of rod member 17. Rod member 15 and 17 effectively form a pair of rods for clamping the support member to the frame 20 of the vehicle, as shown in FIGS. 2 and 3. Bolts 21 and 22, which run through apertures in the rod member hold arm 16 and rod member 15 and 17 together in conjunction with nuts 23 which engage the bolts.

The device of the invention thus provides firm support for a person running out from the side of the vehicle, this support being angularly adjustable to reduce the extension of the support panel from the side of the vehicle.

While the invention has been described and illustrated in detail, this is intended by way, of illustration and example only and not by way of limitation, the scope and spirit of the invention being limited by the following claims.

I claim:

1. A support device for supporting a person on a frame of a vehicle comprising:
    a support member, means for clamping a first end of said support member to the frame of the vehicle, said support member comprises a pair of arms substantially at right angles to each other;
    a step unit supported on a second end of said support member for ninety degrees pivotal motion relative to said support member; and
    a panel attached to said step unit, said person being supported on said panel; and
    a third arm positioned angularly between an upper part of one of said pair of arms and a lower part of one of said arms to form a triangular configuration;
    wherein said triangular configuration facilitates proximal location of said step unit to said vehicle to provide increased strength and support for said person located on said step unit while said step unit is located proximal to said vehicle in motion; and
    wherein said step unit is attached to a pivot point located at a coupling location of said third arm and one end of one of said pair of arms.

2. The support device of claim 1 wherein the means for clamping a first end of said support member to said frame of said vehicle comprises bolts for clamping said at least one of the said pair of arms together with the frame clamped there between.

3. The support device of claim 1 wherein said support member comprises a firm support for said person while exiting from said vehicle using said step unit.

4. The support device of claim 1 wherein said triangular configuration provides for angular adjustment to reduce extension of said panel from a side of said vehicle when said vehicle is in motion.

* * * * *